United States Patent [19]

Davidson et al.

[11] 4,025,711

[45] May 24, 1977

[54] LATEX COAGULATION PROCESS USING LIGNIN COMPOUND

[75] Inventors: Melvin John George Davidson, Yarimca, Turkey; Richard Helmut Wunder, Corunna, Canada

[73] Assignee: Polysar Limited, Sarnia, Canada

[22] Filed: Mar. 8, 1976

[21] Appl. No.: 665,075

[30] Foreign Application Priority Data

Mar. 20, 1975 Canada ............................... 222661

[52] U.S. Cl. .............................. 528/488; 260/17.5; 260/23 S; 260/33.6 AQ; 528/491; 528/492
[51] Int. Cl.$^2$ .......................................... C08F 6/22
[58] Field of Search ........... 260/33.6 AQ; 528/488, 528/491, 492

[56] References Cited

UNITED STATES PATENTS 3,821,185  6/1974  Cooper et al. ..................... 528/491

*Primary Examiner*—Stanford M. Levin
*Attorney, Agent, or Firm*—Stevens, Davis, Miller & Mosher

[57] ABSTRACT

Synthetic styrene-conjugated diolefin polymers, e.g. SBR rubbers, are recovered from their aqueous polymerization emulsion by coagulation with acid and a lignin compound. The conventional use of sodium chloride as a coagulant is avoided so as to overcome the problem of sodium chloride in the effluent. By this process of the invention, a rubber crumb of increased porosity is obtained, which is easier to dry.

5 Claims, No Drawings

LATEX COAGULATION PROCESS USING LIGNIN COMPOUND

This invention relates to processes for the production of synthetic polymers by aqueous emulsion polymerization, and more particularly to the recovery of styrene-conjugated diolefin polymers from the aqueous polymerization emulsion.

Many synthetic polymers, for example styrene-butadiene copolymer rubbers (SBR) are produced by aqueous emulsion polymerization, in which the monomers are polymerized in an aqueous system containing a suitable free radical polymerization initiation system and emulsifying agents. Emulsion polymerization results in a colloidal dispersion of rubber in water, namely a latex. It is then necessary to recover the rubber from the latex to obtain solid particles, or rubber crumb, in a suitable form for finishing, packaging and shipping. The recovery process involves, in combination, the steps of creaming the latex, coagulation to form rubber crumb and soap conversion. For creaming and coagulation, an electrolyte is added to decrease the stability of the colloidal rubber particles in the emulsion and cause the formation of larger particles, and an acid is added to cause coalescence of the particles into the rubber crumb. In the soap conversion step, the soap or emulsifying agent is chemically converted to its acidic form by the acid added during coagulation. This is followed by separation of the rubber crumb, washing and drying thereof.

It has been the common practice of the synthetic rubber industry for many years to use brine, a solution of sodium chloride, as the electrolyte in the creaming and coagulation of synthetic rubber latex. This is generally on account of its cheapness and its efficiency in causing the desired agglomeration of rubber particles. However, use of brine has a number of associated problems, perhaps the most serious of which is the resulting presence of the brine in the aqueous effluent. Brine in plant effluent is a serious problem, since for ecological reasons it cannot simply be dumped into streams or spread on land, and yet it is difficult and extremely costly to remove sodium chloride from an aqueous effluent to the ecologically desirable extent prior to discharging the effluent. Whilst synthetic rubber recovery processes can be operated continuously with recycle and re-use of at least a part of the brine, substantial amounts of brine must still be discarded.

It is accordingly an object of the present invention to provide a process of recovering styrene-conjugated diolefin polymers from aqueous emulsion which can be operated without the use of sodium chloride.

Hereinafter, the term "salt" is used to denote sodium chloride, exclusively, and all parts referred to are parts by weight unless otherwise specified.

Thus according to the present invention there is provided a process of recovering synthetic styrene-conjugated diolefin polymers from aqueous latex which comprises coagulating the latex under acid conditions in the presence of from about 0.2 to about 5 parts, per 100 parts of dry polymer, of a lignin compound, and in the substantial absence of salt, and subsequently separating the coagulated polymer from the serum.

The use of a lignin compound in place of salt as a coagulating aid not only solves the ecological problem of salt in the effluent, but also and most surprisingly has proved to yield a rubber crumb of increased porosity. Such a rubber crumb offers very significant practical and economical advantages, since it is easier and quicker to dry than rubber crumb with a lesser degree of porosity. The lignin compound is retained in the rubber crumb, not in the aqueous effluent.

Lignin and lignin compounds are naturally occurring components of wood, which effectively serve as a binding medium holding the cellulosic fibres of the wood together. Chemically, their constitution is not fully known, and indeed tends to be variable. They are resinous, semi-solid, polymeric substanes, produced in significant commercial quantities as by-products of wood pulping processes. The term lignin compound as used in the present invention means the powdered lignin or the alkali metal or ammonium lignates. Lignin compounds are by-products of the Kraft paper process. The sodium, potassium and ammonium lignates, and powdered lignin, are preferred for use in the present invention, with sodium lignate most preferred on account of its ready commercial availability. A typical process for manufacure of sodium lignate involves recovery of the lignin from the Kraft black liquor by precipitating it out with acid. This precipitated material is then redissolved by reaction with aqueous caustic soda. The resulting 30–40% solution of sodium lignate may be spray dried or may be used as such. The product has a molecular weight of about 3,000, and contains from about 2 to 4% of impurities, mainly fatty and rosin acids. The sodium lignate may be further purified by reprecipitation and dried so as to produce a very fine particulate size lignin. The process of the present invention most preferably uses aqueous solutions of sodium lignate. Further purified lignin or lignates are not necessary for use in the present invention but may be used if desired. However, the lignin compound used should have a purity of not less than about 80–85%, since the impurities might affect the subsequent curing of the rubber.

The preferred amount of the lignin compound which is added to the latex according to the present invention depends to some extent upon the point of addition of the lignin compound to the latex, the form of the latex and other features of the particular rubber recovery and finishing process and apparatus being employed. The addition of large amounts of a lignin compound results in the formation of a rubber crumb of very fine particle size which is difficult to dry, and which some types of conventional rubber drying systems may not be capable of handling in a satisfactory manner. In a synthetic rubber recovery process, it is normal to add acid and coagulant continuously in liquid form to a coagulation vessel, and then separate the solid rubber crumb from the liquid, or serum, part of the serum being discarded and part being recycled to the coagulation vessel. According to the present invention, the lignin compound may be added directly to the coagulation vessel, in which case the preferred amount of the lignin compound added is from about 0.2 to about 1.5 parts per 100 of rubber. If desired, however, the lignin compound may be added to the serum recycle stream, prior to its entering the coagulation vessel, in which case it is preferred to add from about 0.5 to about 2 parts of the lignin compound per 100 parts of rubber. When sodium lignate is the lignin compound being used, the preferred amount is from about 0.2 to about 1.5 parts of the lignin compound per 100 parts rubber. When powdered lignin compound is used, it is preferred to add from about 0.5 to about 2 parts per 100 rubber.

In other respects, the process according to the present invention is similar to that used previously for the coagulation and recovery of synthetic styrene-butadiene polymers. Thus after polymerization has proceeded to the desired extent, it is terminated by addition of a short stop such as a carbamate compound, which reacts with any remaining free radicals to prevent formation of new polymer chains. The unreacted monomers are then removed, e.g. by flash distillation, degassing and/or steam stripping. A suitable antioxidant is added at a suitable stage in the process and, if desired, other components of the final rubber composition such as oil and carbon black can be added, and the latex is coagulated.

As in previous coagulation processes, the latex and lignin compound is added to dilute acid, generally sulfuric acid, to accomplish the coagulation. The amount of acid is sufficient to ensure substantially complete precipitation of the lignin compound, so that the effluent from the process of the invention is substantially free from dissolved lignin compound. For this purpose, sufficient acid should be added to keep the pH of the mixture at or below 3.5, and preferably in the range from about 2.5 to about 3.5. It is normal and preferred to use sulfuric acid, although hydrochloric acid can be used if desired.

It is also preferred to add to the latex a small amount (from about 0.02 to about 0.3 parts per 100 parts of rubber) of a water soluble polyamine, polyamide or cationic emulsifier such as a monoamine compound. Natural polyamides such as glue can also be used. This is in accordance with known processes. These compounds assist in the coagulation process by reacting with and deactivating certain constituents of the emulsifier system used during the polymerization, and thereby help to break the emulsion.

The operating conditions of the coagulation step according to the present invention are generally in accordance with those of the prior art and well established in the industry. The desirable pH range has been discussed above. The temperature of coagulation is suitably from about 100° F (36° C) to 180° F (83° C), and preferably from about 130° F (55° C) to about 150° F (66° C), the higher temperatures tending to give faster coagulation rates. The pressure in the coagulation vessel is at or near atmospheric. In the process of the invention, the addition of salt to the system is avoided.

Once the coagulation process has been completed, the rubber product is separated from the aqueous liquid, or serum, suitably by screening. The serum exhibits a remarkably high degree of clarity in the process of the present invention, indicating a low concentration of suspended rubber fines present therein to be fed to the effluent, as compared with serum from a conventional salt coagulation process. The rubber product at this stage is in the form of a porous crumb. The size of the crumb is influenced to some extent by the amount of lignin compound present and to a very small extent by the coagulation temperature. It is fairly uniform in size. Its degree of porosity is a striking feature of the product produced according to the process of the invention. It appears to have a great number of pores throughout, and this is of great practical importance since it allows ready removal of water, especially by squeezing. The porous crumb is dried by any of the well known means, such as by passing to a de-watering extruder as the next stage in a conventional finishing process, wherein a substantial amount of the residual water is removed by squeezing, the product from the de-watering extruder retaining its porous nature and normally having a water content of from about 8 to about 14%, the product then being passed through a final drying stage such as an extruder drier or a tunnel drier which may have a plurality of stages and in which hot air is used to dry the rubber. Then the rubber passes to a baler. On account of the higher degree of porosity of the product of the present invention as compared with salt coagulated rubber, the power requirements for the final drying stages, e.g. the tunnel drier or extruder drier are substantially reduced.

The final product of the present invention is generally useful in the same applications and end uses as the corresponding styrene-butadiene polymers finished by the conventional salt coagulation process. However, it is to be kept in mind that the products of the process of the present invention contain a lignin compound, predominantly in its acid form, which confers on the final product a colour of light to medium dark brown. For many rubber applications where SBR is used, this is unimportant since the rubber is compounded with carbon black in any event. However, because of their colour, the products of the process of the invention are not generally suitable for making white rubber compounds.

In other respects, the presence of the lignin compound in the final product is not disadvantageous. No significant change in the physical properties and characteristics of the polymers is apparent. The lignin compound in the small amounts used does not appear to interfere with the subsequent curing of the polymers, or with the properties of the vulcanizates so obtained. The product of the process of the present invention also has the further advantage of a lower content of inorganic impurities, which are incompatible with the rubber and tend to detract from its properties.

The process of the present invention can be used for coagulation of latices of substantially any styrene-conjugated diolefin copolymers. It finds its largest application in the coagulation of styrene-butadiene rubbers (SBR). It can be used in the coagulation of oil-SBR masterbatches, black-SBR masterbatches and oil-black-SBR masterbatches, as well as in coagulation of SBR itself. It can also be used in the coagulation of high styrene content styrene-butadiene polymers.

The invention is further described in the following specific examples.

EXAMPLE 1

A 25% solids content aqueous latex of styrene-butadiene copolymer rubber (23.5% styrene) prepared by a normal cold emulsion polymerization process using mixed fatty acid/rosin acid soap emulsifying system, was coagulated with sodium lignate and acid, in the absence of salt, and the nature of the crumb obtained was observed.

A 10% aqueous solution of sodium lignate was used. A 5% aqueous solution of polyamine and 5% sulfuric acid were also used. The experiment was performed by metering the solutions and latex at the desired rate into a first 3 gallon pail equipped with agitation means, the pail initially containing 10 liters of water. This pail overflowed through a trough into a second 3 gallon pail containing 10 liters of water and equipped with agitation means.

The latex was fed into the first pail continuously at the rate of 200 ml per minute, the polyamine solution continuously at 0.15 parts polyamine per 100 parts rubber per minute, the lignate continuously at a rate of 0.7 parts lignate per 100 parts rubber per minute, and sulfuric acid at a rate sufficient to maintain a pH value of 3.0. The temperature of the mixture was 60° C (140° F). The experiment was run for about 2 hrs. to establish equilibrium conditions.

There were obtained springy porous crumbs of coagulated rubber, of optimum size. The lignin present appeared to precipitate under the acidic conditions of the experiment to protect the rubber particles and prevent their fusion together.

When the above experiment was repeated, except for the omission of lignate, the coagulated rubber obtained was in the form of sticky crumbs which massed to form large agglomerates, rendering the rubber extremely difficult to handle and dry. Also, the serum obtained was slightly milky, indicating the presence of suspended rubber fines therein, due to an incomplete coagulation.

EXAMPLE 2

The procedure of Example 1 was repeated, except that different coagulation temperatures were used. Samples of the same latex and ingredient solutions at the same rate of feed, were used, in the same manner. In a first batch, the coagulation temperature was 40° C (104° F) and in a second batch the coagulation temperatures was 80° C (176° F). Both batches yielded a coagulated rubber crumb of a springy porous nature ad described in Example 1. The first batch had a very slow coagulation rate, whereas the second batch coagulated at at least the same rate as that of Example 1.

EXAMPLE 3

The procedure of Example 1 was repeated, except that in place of the polyamine solution, a 5% aqueous solution of animal glue was used. This was metered into the first reaction pail at the rate of 0.03 parts of glue per 100 parts of rubber per minute. Otherwide the ingredient, feed rates, apparatus and procedures were as described in Example 1. The coagulation temperature was 60° C (140° F).

The coagulation rate was slightly lower than that experienced with Example 1. A springy porous crumb was obtained as described in Example 1.

EXAMPLE 4

An oil extended SBR was coagulated with a lignin compound and acid, in the absence of salt, on a macroscale, and the recovered rubber was compounded, cured and tested for physical properties to compare with a conventional brine/acid coagulated product.

The latex contained 20% by weight of dry SBR, containing 23.5% bound styrene. There was prepared a 33% emulsion of water in oil, the oil being of the highly aromatic type (Sundex 8125)*. A 20% solution of sodium lignate in water was prepared, as well as a 10% solution of mixed polyamine (Nalco 107)* and a 5% solution of sulfuric acid.

* Trade Marks

The ingredients were metered continuously into a coagulation vessel at the following feed rates:

latex - 5 lbs. (453 g dry rubber) per minute oil emulsion - 1.1 lbs. per minute, to provide 37.5 parts oil per 100 parts rubber lignate - 15cc per minute (0.68 parts per 100 rubber) later increased to 19.8cc per minute (0.91 parts per 100 rubber)

polyamine - sufficient to provide 0.145 parts per 100 rubber acid - sufficient to maintain a pH of 2.9.

The temperature of coagulation was 60° C (140° F). The experiment proceeded continuously for about 4 hrs. After the feed streams were shut off, the serum in the coagulation vessel cleared up in about 15–30 sec., which is at least as fast as normally experienced in a salt coagulation process.

The rubber crumbs obtained were re-dispersible at all times, and were springy and highly porous.

The sample of this rubber crumb was then compounded and cured. A sample of similar oil extended rubber, of the same polymer and same oil content, but coagulated in the conventional brine/acid system was also compounded and cured in the same recipe and under the same conditions. Their respective physical properties were then tested. The compounding recipe in each case was as follows:

| | |
|---|---|
| oil extended rubber | 137.5 parts |
| ISAF black | 70 parts |
| zinc oxide | 3.0 parts |
| stearic acid | 1.5 parts |
| Flexzone 7L* | 1.5 parts |
| Sundex 8125* oil | 2.5 parts |
| sulfur | 2.0 parts |
| N-cyclohexyl-2-benzothiazole sulphenamide | 0.8 parts |
| Diphenylguanidine | 0.3 parts |

The compound so formed from the oil extended rubber coagulated according to the invention had a Mooney viscosity (ML4 at 100° C) of 64.5, whereas that of the control had a Mooney viscosity of 58.0. Their respective extrusion rates, in inches/minute were 134.6 for the compound of the rubber produced according to the invention, and 132.3 for the control. Their respective dieswells were 95.9% and 97.8%.

The compounds were cured by heating at 163° C for 17 minutes. Then the physical properties were determined in the well known way, and the results obtained are reported in Table 1.

TABLE 1

| | | Lignate Coagulated Rubber Vulcanizate | Control |
|---|---|---|---|
| Shore A hardness | | 55 | 55 |
| 100% modulus (psi) | | 200 | 200 |
| 300% modulus (psi) | | 1060 | 1040 |
| Tensile strength (psi) | | 3200 | 2920 |
| Elongation (%) | | 610 | 600 |
| Akron Abrasion, % of control (20° angle) | | 157.5 | 147.8 |
| Dunlop Rotary Power Loss Joules/rev at | 25° C | 3.92 | 4.05 |
| | 50° C | 3.62 | 3.82 |
| | 75° C | 3.44 | 3.61 |
| | 100° C | 3.35 | 3.49 |
| Skid resistance on rough | | | |

TABLE 1-continued

|  | Lignate Coagulated Rubber Vulcanizate | Control |
|---|---|---|
| wet asphalt | 45.4 | 42.6 |

It will be seen that the two vulcanizates exhibit substantially similar characteristics, with the lignate coagulated rubber vulcanizate showing slight advantages over the control demonstrating that the presence of the lignin in the rubber produced according to the invention has no deleterious effect on the vulcanizate properties.

EXAMPLE 5

An oil extended SBR rubber was coagulated according to the process of the present invention and finished in the conventional way, on the plant scale.

The oil extended rubber was the same as that described in Example 4. For the salt free coagulation there was used a 10% aqueous solution of sodium lignate and a 2% aqueous solution of mixed polyamine (Nalco 107). The coagulation temperature was 135° F (57° C). The materials were fed continuously to a coagulation vessel. The relative rates of flow were adjusted to give about 0.5% lignin based on rubber content of the finished product, and about 0.22% polyamine based on rubber content of the product. Dilute sulfuric acid was added to maintain the pH of the coagulation at about 2.8–3.0. The above are the quantities and conditions used whilst the process was being operated under steady state conditions.

A highly porous, springy rubber crumb was obtained, with reasonably rapid coagulation. The crumb was passed through a normal plant scale tunnel drier, which in the case of conventionally coagulated SBR crumb required three passes to reduce the moisture content to acceptable levels. With this product, however, satisfactorily low moisture content levels were achieved after only two passes.

Samples of the overflow serum effluent were taken periodically throughout this plant run, and analyzed for both suspended and dissolved solids content. These had a dissolved solids content of about one-tenth that found for the effluent from a normal salt coagulation of an SBR polymer, the difference being due to the absence of salt. The effluent from the process of this example was analyzed for suspended solids (rubber fines) which was found in all cases to lie within the range 30–160 parts per million once steady state conditions were achieved; for chemical oxygen demand (COD) which was found to be in the range 300–700 parts per million; and total oxygen demand (TOD) which was found to be in the range 35–56 parts per million. These results compare favourably with those normally determined for a conventional SBR serum effluent.

EXAMPLE 6

This example uses powdered lignin as the compound. Lignin was emulsified in water by adding the powdered lignin to water containing 0.2% of the condensed naphthalene sulphonate emulsifier. The lignin emulsion was mixed with the latex of Example 1 in sufficient amount to provide 2 parts of lignin per 100 parts of rubber and this mixture was added at 200 cc/minute to the first pail of Example 1. Also added, as in Example 1, was sufficient polyamine solution to provide 0.15 parts per 100 parts of rubber and sulfuric acid at a rate sufficient to maintain a pH value of 3.0. The temperature was 60° C.

The crumb obtained was of a nature essentially similar to that of Example 1.

What is claimed is:

1. A process of recovering synthetic styrene-conjugated diolefin polymers from aqueous latex which comprises coagulating the latex, in the substantial absence of sodium chloride, at a temperature of from about 100° F to about 180° F in the presence of sufficient sulphuric acid to maintain the pH of coagulation at about 2.5 to about 3.5 and subsequently separating the coagulated polymer from the serum, the improvement being the addition of from about 0.2 to about 5 parts by weight, per 100 parts by weight of dry polymer solids, of a lignin compound selected from powdered lignin, sodium lignate, potassium lignate and ammonium lignate.

2. The process of claim 1 in which the lignin compound is added directly to the latex in an amount of from about 0.2 to about 1.5 parts by weight per 100 parts by weight of dry polymer solids.

3. The process of claim 1 in which at least a portion of the serum is recycled to the latex coagulation step and the lignin compound is added to the recycle serum in an amount of from about 0.5 to about 2 parts by weight per 100 parts by weight of dry polymer solids.

4. The process of claim 1 in which the coagulation is conducted in the presence of a water soluble polyamine, polyamide or cationic emulsifier in an amount of from about 0.02 parts to about 0.3 parts by weight per 100 parts by weight of dry polymer solids.

5. The process of claim 1 in which the styrene-conjugated diolefin polymer is a styrene-butadiene rubber optionally containing an extender oil.

* * * * *